(12) United States Patent
Kim

(10) Patent No.: US 10,787,159 B2
(45) Date of Patent: Sep. 29, 2020

(54) ELECTRONIC BRAKE SYSTEM

(71) Applicants: HYUNDAI MOTOR COMPANY, Seoul (KR); KIA MOTORS CORPORATION, Seoul (KR)

(72) Inventor: Tae Heon Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 25 days.

(21) Appl. No.: 16/298,676

(22) Filed: Mar. 11, 2019

(65) Prior Publication Data

US 2020/0180580 A1 Jun. 11, 2020

(30) Foreign Application Priority Data

Dec. 11, 2018 (KR) .................. 10-2018-0159508

(51) Int. Cl.
| | | |
|---|---|---|
| *B60T 13/68* | (2006.01) | |
| *B60T 13/14* | (2006.01) | |
| *B60T 17/06* | (2006.01) | |
| *B60T 8/17* | (2006.01) | |
| *B60T 17/22* | (2006.01) | |
| *B60T 8/171* | (2006.01) | |
| *B60T 13/58* | (2006.01) | |

(52) U.S. Cl.
CPC .............. *B60T 13/686* (2013.01); *B60T 8/17* (2013.01); *B60T 8/171* (2013.01); *B60T 13/145* (2013.01); *B60T 13/58* (2013.01); *B60T 17/06* (2013.01); *B60T 17/221* (2013.01); *B60T 2270/402* (2013.01); *B60T 2270/404* (2013.01)

(58) Field of Classification Search
CPC .......... B60T 8/17; B60T 8/171; B60T 8/4081; B60T 13/686; B60T 13/145; B60T 13/58; B60T 17/06; B60T 17/221; B60T 2270/402; B60T 2270/404
See application file for complete search history.

(56) References Cited

U.S. PATENT DOCUMENTS

| | | | | |
|---|---|---|---|---|
| 9,834,189 | B2* | 12/2017 | Jung | B60T 13/686 |
| 10,046,744 | B2* | 8/2018 | Oosawa | B60T 13/662 |
| 10,137,877 | B2* | 11/2018 | Feigel | B60T 8/4081 |
| 10,583,819 | B2* | 3/2020 | Kim | B60T 13/662 |
| 10,696,281 | B2* | 6/2020 | Jeong | B60T 17/221 |
| 10,696,286 | B2* | 6/2020 | Jeong | B60T 8/00 |
| 2013/0086898 | A1 | 4/2013 | Yang | |
| 2017/0015290 | A1* | 1/2017 | Oosawa | B60T 13/146 |
| 2018/0111594 | A1* | 4/2018 | Kim | B60T 13/142 |
| 2018/0339690 | A1* | 11/2018 | Kim | B60T 7/042 |
| 2018/0339692 | A1* | 11/2018 | Jeong | B60T 8/172 |
| 2019/0092300 | A1* | 3/2019 | Jeong | B60T 8/341 |
| 2019/0092301 | A1* | 3/2019 | Jeong | B60T 8/341 |
| 2019/0100183 | A1* | 4/2019 | Jung | B60T 13/166 |
| 2019/0100185 | A1* | 4/2019 | Jeong | B60T 13/662 |

(Continued)

FOREIGN PATENT DOCUMENTS

KR 20130037874 4/2013

*Primary Examiner* — Thomas W Irvin
(74) *Attorney, Agent, or Firm* — Lempia Summerfield Katz LLC

(57) ABSTRACT

An electronic brake system allows the effective braking pressure to be formed in response to occurrence of a minute leak in a hydraulic circuit, whereby the stability and reliability for braking is improved.

10 Claims, 6 Drawing Sheets

(56) References Cited

U.S. PATENT DOCUMENTS

| | | | |
|---|---|---|---|
| 2019/0100186 A1* | 4/2019 | Jeong | B60T 8/4081 |
| 2019/0100187 A1* | 4/2019 | Jeong | B60T 13/662 |
| 2019/0232935 A1* | 8/2019 | Kim | B60T 11/20 |
| 2019/0329749 A1* | 10/2019 | Jeong | B60T 7/042 |
| 2019/0329750 A1* | 10/2019 | Jeong | B60T 8/409 |
| 2019/0329751 A1* | 10/2019 | Jeong | B60T 13/745 |
| 2019/0366997 A1* | 12/2019 | Jeong | B60T 8/4081 |
| 2020/0108813 A1* | 4/2020 | Kim | B60T 13/686 |
| 2020/0114893 A1* | 4/2020 | Kim | B60T 13/165 |
| 2020/0198607 A1* | 6/2020 | Weitze | B60T 8/3205 |

* cited by examiner

ELECTRONIC BRAKE SYSTEM

CROSS REFERENCE TO RELATED APPLICATION

The present application claims priority to Korean Patent Application No. 10-2018-0159508, filed Dec. 11, 2018, the entire contents of which is incorporated herein for all purposes by this reference.

BACKGROUND

Field of the Disclosure

The present disclosure relates to an electronic brake system, which allows effective braking pressure to be formed in response to occurrence of a minute leak in a hydraulic circuit.

Description of the Related Art

Generally, a brake system of an automobile using hydraulic pressure is a system for braking wheels by supplying hydraulic pressure generated in a master cylinder to a wheel brake installed on each wheel when a driver presses the brake pedal.

Conventionally, a vacuum supplied from an engine has been used as a boosting pressure for increasing the braking pressure. However, electric vehicles and hybrid electric vehicles have been recently receiving increased attention of the market. As a result, a technique has been developed by installing an electric booster driven by a driving force of a motor in the master cylinder such that, when the driver presses the brake pedal, the electric booster is driven to allow hydraulic pressure to be generated in the master cylinder.

A braking pressure by the fluid may be formed in the hydraulic circuit. However, when the fluid is lost because of the occurrence of a minute leak, a situation where the braking cannot be accomplished may occur. Conventionally, when the brake tube is ruptured or a hole is formed in the steel pipe of the brake tube whereby the hydraulic pressure is not properly formed, it is determined that the fluid is lost, and a warning is given to the driver.

However, when torque tightening is not performed at the time the brake tube is fastened or a difference in pressure change is not detected for the occurrence of a minute leak induced by a fine foreign matter, the fluid may be lost until a situation where the braking cannot be accomplished occurs. Thereby, a safety accident may occur.

The foregoing is intended merely to aid in the understanding of the background of the present disclosure. The foregoing is not intended to mean that the present disclosure falls within the purview of the related art that is already known to those of ordinary skill in the art.

SUMMARY

Accordingly, the present disclosure has been made keeping in mind the above problems occurring in the related art. The present disclosure is intended to propose an electronic brake system that allows effective braking pressure to be formed in response to occurrence of a minute leak in a hydraulic circuit, thereby improving stability and reliability for braking.

In order to achieve the foregoing object, according to one aspect of the present disclosure, an electronic brake system is provided. The electronic brake system includes a reservoir having a plurality of compartments storing fluids. The electronic brake system further includes a master cylinder connected to a brake pedal and provided with a plurality of master chambers connected to some compartments of the plurality of compartments of the reservoir, respectively. The electronic brake system also includes a hydraulic supply cylinder connected to a driving unit. The hydraulic supply cylinder has a plurality of hydraulic chambers connected to another compartment not connected to the plurality of master chambers and a compartment connected to one of the plurality of master chambers, respectively. The electronic brake system further includes a first hydraulic circuit connecting one of the hydraulic chambers of the hydraulic supply cylinder and the wheel brakes of front and rear wheels to each other. The electronic brake system also includes a second hydraulic circuit connecting another one of the hydraulic chambers of the hydraulic supply cylinder and the wheel brakes of the front and rear wheels to each other. The electronic brake system also includes a plurality of on-off valves each provided in the first hydraulic circuit or the second hydraulic circuit, thereby selectively opening and closing a flow path.

The reservoir is provided with a first compartment, a second compartment, and a third compartment storing fluids. The master cylinder is provided with a first master chamber connected to the first compartment and a second master chamber connected to the third compartment. The hydraulic supply cylinder is provided with a first hydraulic chamber connected to the second compartment and a second hydraulic chamber connected to the third compartment.

The second compartment of the reservoir and the first hydraulic chamber of the hydraulic supply cylinder are connected to each other through a first supply flow path. The third compartment of the reservoir and the second hydraulic chamber of the hydraulic supply cylinder are connected to each other through a second supply flow path.

The second supply flow path is provided with a control valve selectively opening and closing the second supply flow path.

The first hydraulic circuit includes a first hydraulic flow path connected to the first hydraulic chamber and the wheel brakes of the front wheels. The first hydraulic circuit further includes a second hydraulic flow path branched off from the first hydraulic flow path and connected to the wheel brakes of the rear wheels. The second hydraulic circuit includes a third hydraulic flow path connected to the second hydraulic chamber and the wheel brakes of the rear wheels and a fourth hydraulic flow path branched off from the third hydraulic flow path and connected to the wheel brakes of the front wheels.

A flow path connecting the first compartment and the first master chamber to each other is connected to the first hydraulic circuit through a first backup flow path. The second supply flow path is connected to the second hydraulic circuit through a second backup flow path.

The on-off valves include a first on-off valve provided in the first hydraulic flow path and selectively opening and closing the first hydraulic flow path. The on-off valves further include a second on-off valve provided in the second hydraulic flow path and selectively opening and closing the second hydraulic flow path. The on-off valves also include a third on-off valve provided in the third hydraulic flow path and selectively opening and closing the third hydraulic flow path.

The on-off valves are configured to further include inlet valves for the front wheels and inlet valves for the rear wheels, each of which is provided correspondingly at the front part of each of the wheel brakes of the front and rear wheels in the hydraulic flow paths connected to the wheel brakes of the front and rear wheels, thereby selectively opening and closing the flow paths.

The system further includes a controller receiving a signal indicative of a fluid volume in the reservoir input via a reservoir volume sensor and controlling operation of the driving unit of the hydraulic supply cylinder and the on-off valves. When the signal indicative of the fluid volume in the reservoir is input as low, the controller controls the first on-off valve and the inlet valves for the front wheels to be opened. The controller further controls the second on-off valve, the third on-off valve, and the inlet valves for the rear wheels to be closed, whereby a first backup mode where the wheel brakes of the front wheels are driven is performed.

The hydraulic supply cylinder is provided with a hydraulic piston dividing the first hydraulic chamber and the second hydraulic chamber and rectilinearly moved by the driving unit. When a signal indicative of the fluid volume in the second compartment is input as a value belonging to a range where the fluid volume is lost in a state where the first backup mode is performed, the controller controls the driving unit, thereby causing the hydraulic piston to be moved to the maximum value toward the first hydraulic chamber. When a pressure value measured via the pressure sensor is below a limiting value, the controller controls the first on-off valve, the second on-off valve, and the inlet valves for the front wheels to be closed and the third on-off valve and the inlet valves for the rear wheels to be opened, whereby a second backup mode where the wheel brakes of the rear wheels are driven is performed.

The controller controls a regulating valve to be opened when the secondary backup mode is performed.

The electronic brake system configured as described above allows the effective braking pressure to be formed in response to occurrence of a minute leak in a hydraulic circuit, whereby the stability and reliability for braking is improved.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
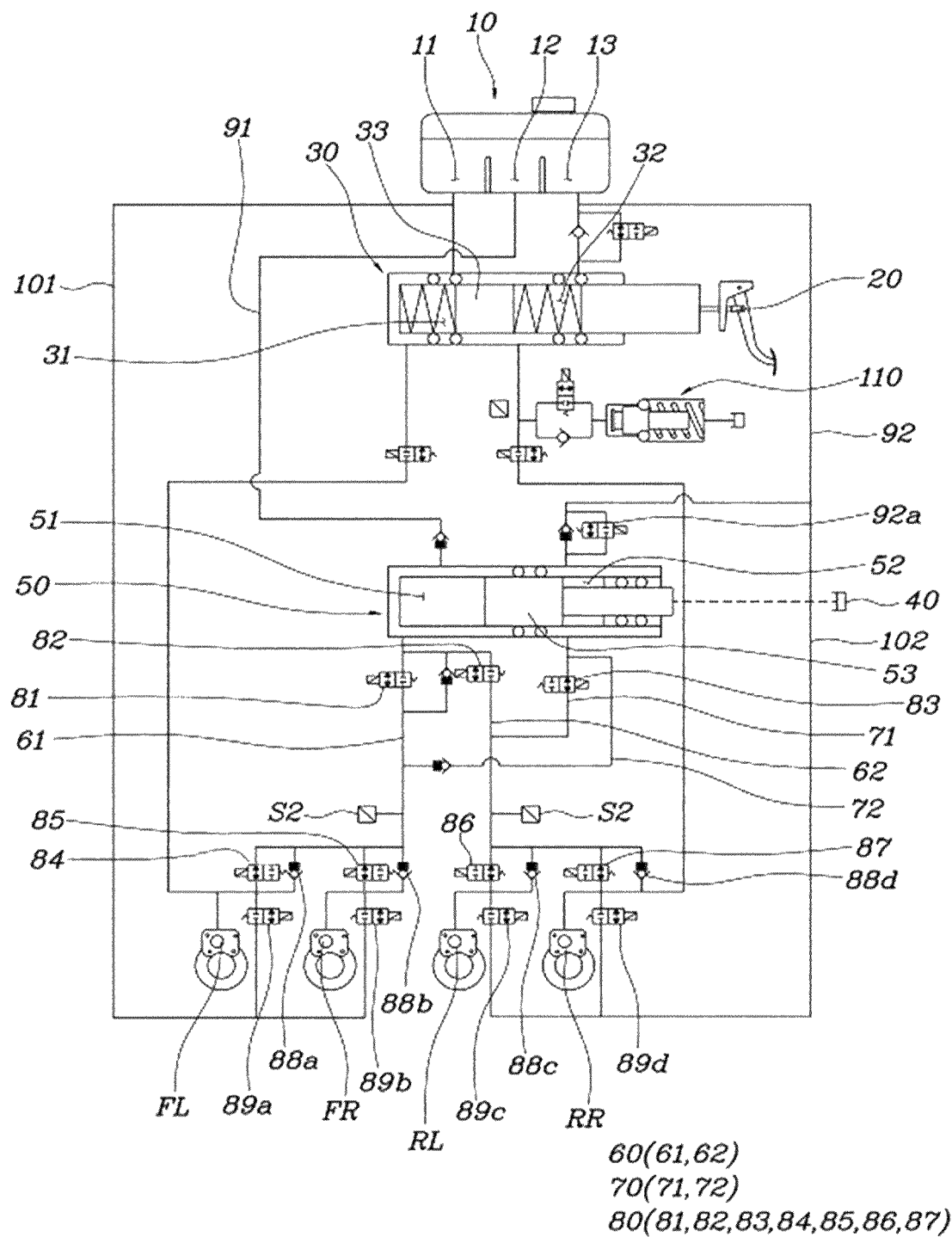
FIG. 1 is a hydraulic circuit diagram of an electronic brake system according to an embodiment of the present disclosure.

Hereinbelow, an electronic brake system according to various embodiments of the present disclosure is described in detail with reference to the accompanying drawings. Throughout the drawings, the same reference numerals refer to the same or like parts.

Figure 2:
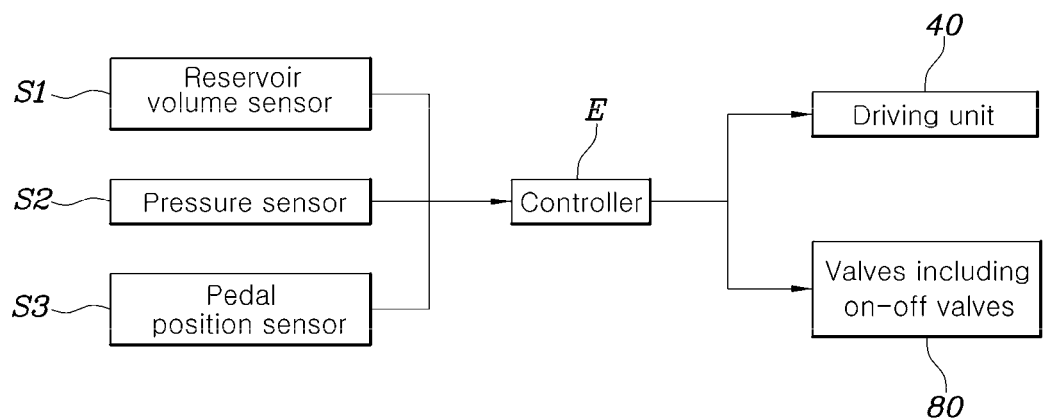
FIG. 2 is a block diagram of the electronic brake system illustrated in FIG. 1.
Figure 3:
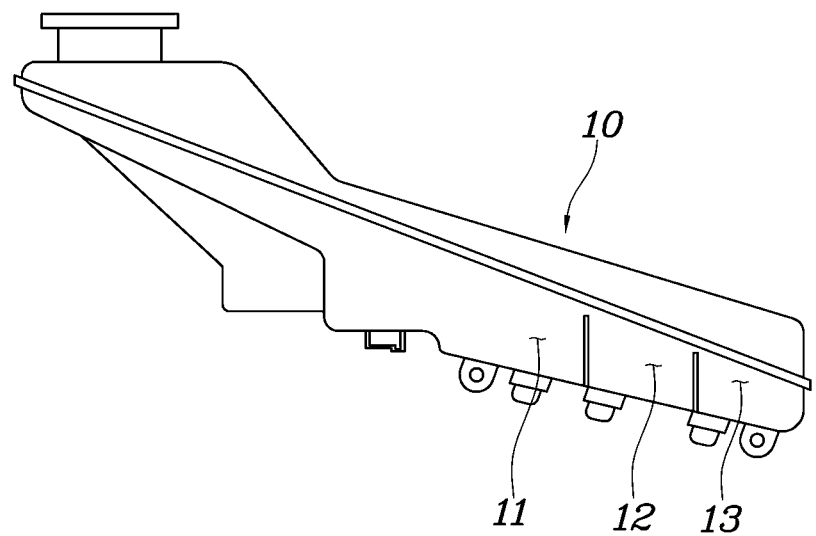
FIG. 3 is a view illustrating a reservoir of the present disclosure.
Figure 4:
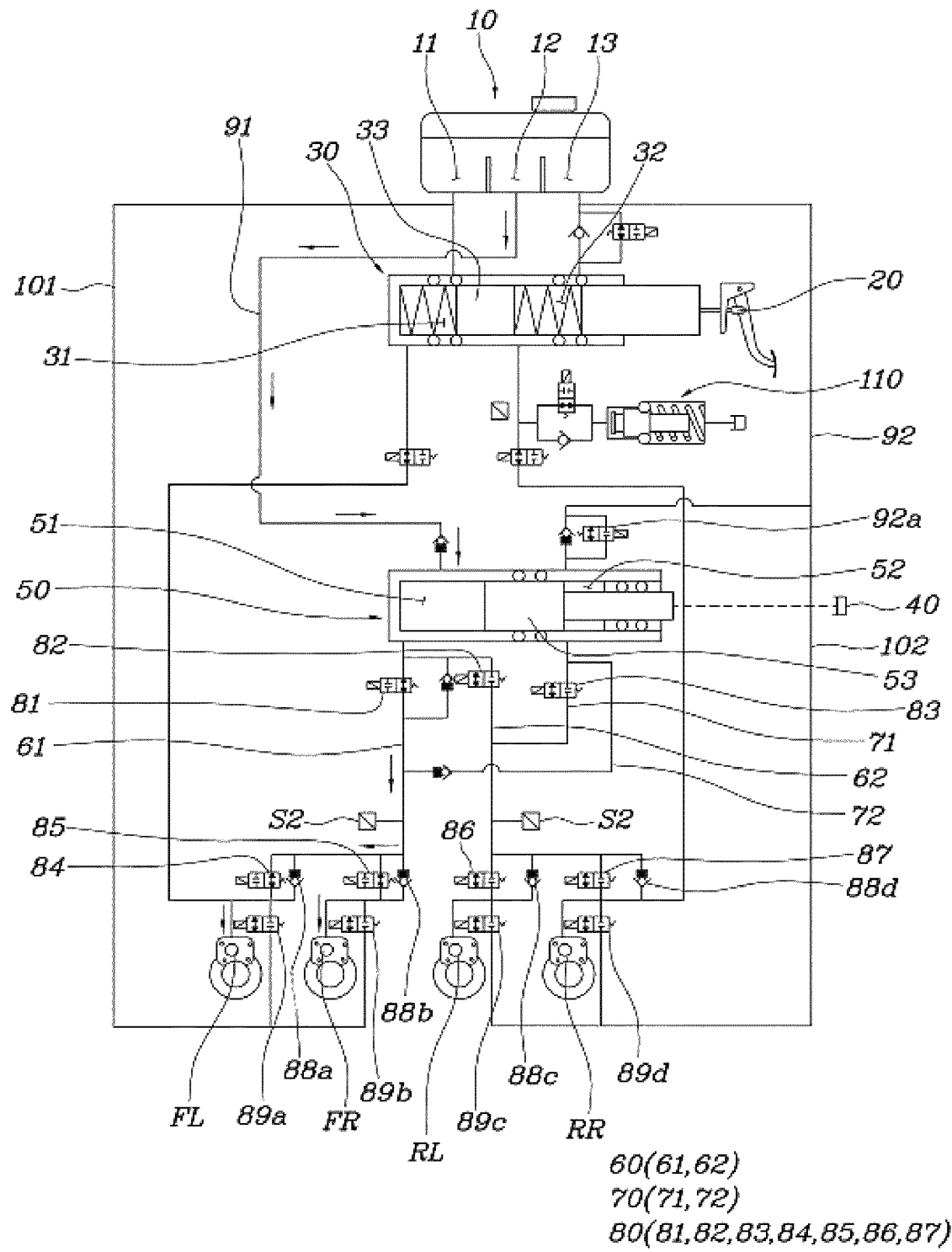
FIG. 4 is a hydraulic circuit diagram illustrating the electronic brake system illustrated in FIG. 1.
Figure 5:
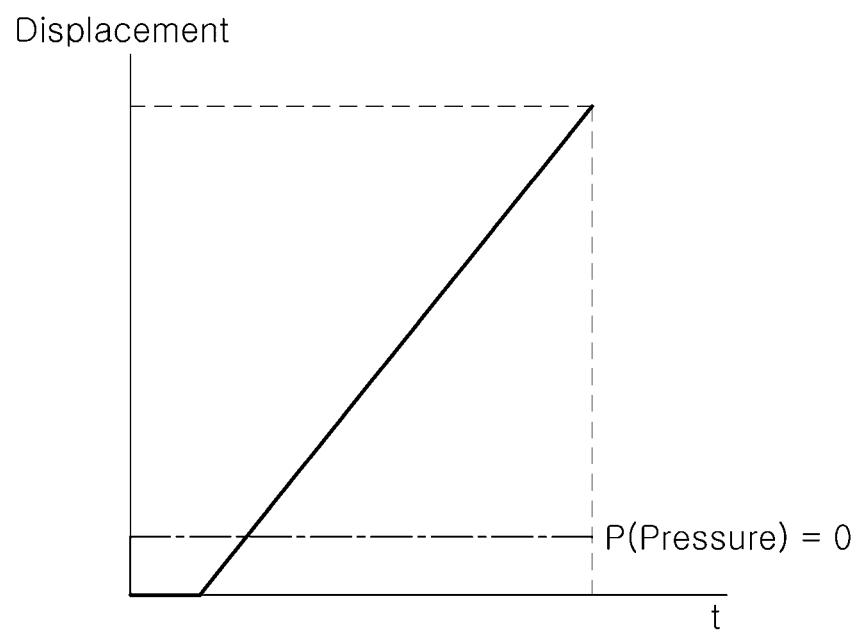
FIG. 5 is a graph illustrating driving of the hydraulic supply cylinder of the present disclosure.
Figure 6:
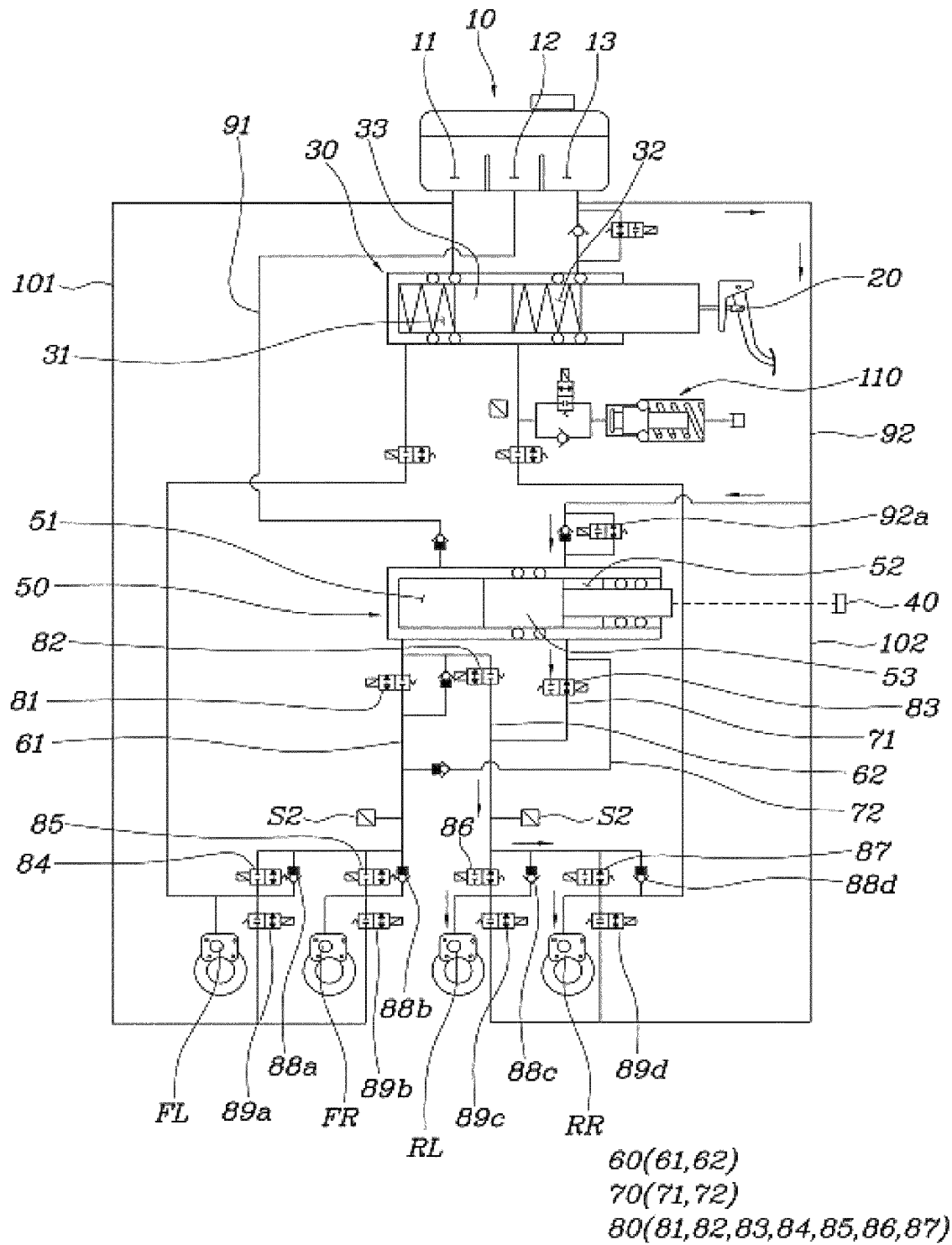
FIG. 6 is a hydraulic circuit diagram illustrating the electronic brake system illustrated in FIG. 1.

FIG. 1 is a hydraulic circuit diagram of an electronic brake system according to an embodiment of the present disclosure. FIG. 2 is a block diagram of the electronic brake system illustrated in FIG. 1. FIG. 3 is a view illustrating a reservoir of the present disclosure. FIG. 4 is a hydraulic circuit diagram illustrating the electronic brake system illustrated in FIG. 1. FIG. 5 is a graph illustrating driving of the hydraulic pressure supply cylinder of the present disclosure. FIG. 6 is a hydraulic circuit diagram illustrating the electronic brake system illustrated in FIG. 1.

As illustrated in FIGS. 1 and 2, the electronic brake system according to the present disclosure includes a reservoir 10 having a plurality of compartments for storing fluids. The electronic brake system further includes a master cylinder 30 connected to a brake pedal 20 and provided with a plurality of master chambers connected to some compartments of the plurality of compartments of the reservoir 10, respectively. The electronic brake system also includes a hydraulic supply cylinder 50 connected to a driving unit 40. The hydraulic supply cylinder has a plurality of hydraulic chambers connected to another compartment not connected to the plurality of master chambers and a compartment connected to one of the plurality of master chambers. The electronic brake system further includes a first hydraulic circuit 60. The first hydraulic circuit 60 connects one of the hydraulic chambers of the hydraulic supply cylinder 50 and the wheel brakes FL, FR, RL and RR of the front and rear wheels. The electronic brake system further includes a second hydraulic circuit 70. The second hydraulic circuit 70 connects another one of the hydraulic chambers of the hydraulic supply cylinder 50 and the wheel brakes FL, FR, RL and RR of the front and rear wheels. The electronic brake system also includes a plurality of on-off valves 80 each provided in the first hydraulic circuit 60 or the second hydraulic circuit 70, thereby selectively opening and closing a flow path.

In the present disclosure, when the brake pedal 20 is manipulated, the braking pressure is transmitted to the wheel brakes FL, FR, RL, and RR of the front and rear wheels according to the pedal effort, whereby braking is performed. The pedal position sensor S3 is provided to sense the displacement of the brake pedal 20 arising from the manipulation of the brake pedal 20. The driving unit 40 is operated in response to the pedal effort of the brake pedal 20. Accordingly, the fluid in the hydraulic chamber of the hydraulic supply cylinder 50 is transmitted to the wheel brakes FL, FR, RL, and RR of the front and rear wheels so as to act as a braking pressure, whereby the vehicle braking is realized.

In addition, the fluid discharged from the master chamber of the master cylinder 30 interlocked with the manipulation of the brake pedal 20 is transmitted to a pedal simulator 110, thereby allowing the operating force of the brake pedal 20 to be formed.

Next, the hydraulic supply cylinder 50 is configured to be connected to the driving unit 40, thereby allowing the fluid in the plurality of hydraulic chambers to flow out by the movement of the driving unit 40. The driving unit 40 may include a motor, a rack shaft, and a pinion. In addition, the driving unit 40 may be configured such that a hydraulic piston 53 in the hydraulic supply cylinder 50 is connected to the rack shaft and moved rectilinearly, thereby allowing the fluid in the plurality of hydraulic chambers to flow out. The plurality of hydraulic chambers provided in the hydraulic supply cylinder 50 are connected to the first hydraulic circuit 60 and the second hydraulic circuit 70, respectively, which are each connected to the wheel brakes FL, FR, RL, and RR of the front and rear wheels. The on-off valves 80 are correspondingly provided in the first hydraulic circuit 60 or the second hydraulic circuit 70 to selectively open and close the flow path.

Accordingly, when the brake pedal 20 is manipulated, the driving unit 40 and the plurality of the on-off valves 80 are selectively operated to perform braking through the wheel brakes FL, FR, RL, and RR of the front and rear wheels. Conversely, when the manipulation of the brake pedal 20 is released, the driving unit 40 is operated in the opposite direction and the flow of fluid is switched to release the braking.

Particularly, in the present disclosure, the reservoir 10 is divided into the plurality of compartments. The plurality of master chambers provided in the master cylinder 30 is connected to the compartments of the reservoir 10, respectively. A plurality of the hydraulic pressure chambers provided in the hydraulic supply cylinder 50 is also connected to the compartments of the reservoir 10, correspondingly. Accordingly, the fluid may be continuously supplied to the hydraulic supply cylinder 50, whereby stable braking may be performed. When a fluid leak occurs in the hydraulic circuit, normal braking may be maintained in response thereto.

More specifically, as illustrated in FIG. 1, the reservoir 10 may be provided with a first compartment 11, a second compartment 12, and a third compartment 13 storing fluids. The master cylinder 30 may be provided with a first master chamber 31 connected to the first compartment 11 and a second master chamber 32 connected to the third compartment 13. The hydraulic supply cylinder 50 may be provided with a first hydraulic chamber 51 connected to the second compartment 12 and a second hydraulic chamber 52 connected to the third compartment 13.

As illustrated in FIG. 3, the reservoir 10 is configured to store the fluid therein. The interior thereof is divided into the first compartment 11, the second compartment 12, and the third compartment 13 by a plurality of partition walls. The reservoir 10 has different fluid volume in decreasing order of an amount in the order of the first compartment 11, the second compartment 12, and the third compartment 13. According to the reservoir 10 divided into the plurality of compartments, even when the fluid volume decreases to a level where a warning light is lit, the fluid is retained up to a height of each compartment, thereby enabling the braking to be performed.

The master cylinder 30 has an interior that is divided into the first master chamber 31 and the second master chamber 32 by a master piston 33. The master piston 33 interlocked with the brake pedal 20 moves rectilinearly, thereby allowing the fluid in the first master chamber 31 and the second master chamber 32 to be discharged.

The hydraulic supply cylinder 50 is divided into the first hydraulic chamber 51 and the second hydraulic chamber 52 by the hydraulic piston 53.

The second compartment 12 of the reservoir 10 and the first hydraulic chamber 51 of the hydraulic supply cylinder 50 may be connected to each other through a first supply flow path 91 and the third compartment 13 of the reservoir 10. The second hydraulic chamber 52 of the hydraulic supply cylinder 50 may be connected to each other through a second supply flow path 92. Accordingly, the first hydraulic chamber 51 of the hydraulic supply cylinder 50 may generate the hydraulic pressure by receiving the fluid from the second compartment 12 of the reservoir 10 through the first supply flow path 91. The second hydraulic chamber 52 of the hydraulic supply cylinder 50 may generate the hydraulic pressure by receiving the fluid from the third compartment 13 of the reservoir 10 through the second supply flow path 92.

The second supply flow path 92 is provided with a control valve 92a selectively opening and closing the second supply flow path 92, whereby the flow of the fluid flowing through the second supply flow path 92 is controlled.

The first hydraulic circuit 60 may include a first hydraulic flow path 61 connected to the first hydraulic chamber 51 and the wheel brakes FL and FR of the front wheels. The first hydraulic circuit 60 may further include a second hydraulic flow path 62 branched off from the first hydraulic flow path 61 and connected to the wheel brakes RL and RR of the rear wheels. The second hydraulic circuit 70 may include a third hydraulic flow path 71 connected to the second hydraulic chamber 52 and the wheel brakes RL and RR of the rear wheels. The second hydraulic circuit 70 may further include a fourth hydraulic flow path 72 branched off from the third hydraulic flow path 71 and connected to the wheel brakes FL and FR of the front wheels. Accordingly, the wheel brakes FL and FR of the front wheels are supplied with the fluids in the first hydraulic chamber 51 and the second hydraulic chamber 52 through the first hydraulic flow path 61 of the first hydraulic circuit 60 and the fourth hydraulic fluid path 72 of the second hydraulic circuit 70, thereby allowing the braking to be performed. Likewise, the wheel brakes RL and RR of the rear wheels are supplied with the fluids in the first hydraulic chamber 51 and the second hydraulic chamber 52 through the second hydraulic flow path 62 of the first hydraulic circuit 60 and the third hydraulic fluid path 71 of the second hydraulic circuit 70, thereby allowing the braking to be performed.

In this example, the on-off valves 80 may include a first on-off valve 81 provided in the first hydraulic flow path 61 and selectively opening and closing the flow path. The on-off valves 80 may further include a second on-off valve 82 provided in the second hydraulic flow path 62 and selectively opening and closing the flow path. The on-off valves 80 may also include a third on-off valve 83 provided in the third hydraulic flow path 71 and selectively opening and closing the flow path. In addition, the on-off valves 80 may be configured to further include inlet valves 84 and 85 for the front wheels and inlet valves 86 and 87 for the rear wheels, each of which is provided correspondingly at the front part of each of the wheel brakes FL, FR, RL, and RR of the front and rear wheels in the hydraulic flow paths connected to the wheel brakes FL, FR, RL, and RR of the front and rear wheels, thereby selectively opening and closing the flow paths.

In addition, in the first hydraulic flow path 61, the second hydraulic flow path 62, the third hydraulic flow path 71 and the fourth hydraulic flow path 72, check valves 88a, 88b, 88c, and 88d are each provided in a bypass flow path connecting the front part and the rear part of each of the inlet valves 84 and 85 for the front wheels and the inlet valves 86 and 87 for the rear wheels and may allow the flow of the fluid to be passed. The fluid may be flowing only from the wheel brakes FL, FR, RL, and RR of the front and rear wheels toward the hydraulic supply cylinder 50.

In addition, in the first hydraulic flow path 61, the second hydraulic flow path 62, the third hydraulic flow path 71 and the fourth hydraulic flow path 72, outlet valves 89a, 89b, 89c, and 89d may be provided for regulating the reverse circulation of the fluid from the wheel brakes FL, FR, RL, and RR of the front and rear wheels when the braking of the wheel brakes FL, FR, RL, and RR of the front and rear wheels is released. In addition, such outlet valves 89a, 89b, 89c and 89d are selectively opened according to the braking pressure when the braking of the wheel brakes FL, FR, RL, and RR of the front and rear wheels is performed, whereby the pressure may be controlled.

Accordingly, by selective switching operation of the on-off valves 80, braking of the wheel brakes FL and FR of the front wheels or the wheel brakes RL and RR of the rear wheel may be selectively performed. In other words, when the first on-off valve 81 and the inlet valves 84 and 85 for the front wheels are opened and the second on-off valve 82, the third on-off valve 83, and the inlet valves 86 and 87 for the rear wheels are closed, braking is performed through the wheel brakes FL and FR of the front wheels. When the first on-off valve 81, the second on-off valve 82, and the inlet valves 84 and 85 for the front wheels are closed, and the third on-off valve 83 and the inlet valves 86 and 87 for the rear wheels are opened, braking can be performed through the wheel brakes RL and RR of the rear wheels.

A flow path connecting the first compartment 11 and the first master chamber 31 to each other may be connected to the first hydraulic circuit 60 through a first backup flow path 101. The second supply flow path 92 may be connected to the second hydraulic circuit 70 through a second backup flow path 102.

Accordingly, the first hydraulic circuit 60 may be connected to the first compartment 11 of the reservoir through the first backup flow path 101 to be supplied with the fluid. The second hydraulic circuit 70 may be connected to the second supply flow path 92 through the second backup flow path 102 to be supplied with the fluid from the third compartment 13 of the reservoir. Accordingly, the first backup flow path 101 and the second backup flow path 102 secure the braking pressure when braking is performed through the wheel brakes of the front and rear wheels.

Accordingly, the hydraulic circuit according to the present disclosure may allow the braking to be performed by providing hydraulic pressure to the wheel brakes of the front and rear wheels as well as may allow the braking pressure to be maintained in response to the occurrence of minute leak.

More specifically, the present disclosure further includes a controller E receiving a signal indicative of the fluid volume in the reservoir 10 input via a reservoir volume sensor S1 and controlling operation of the driving unit 40 of the hydraulic supply cylinder 50 and the on-off valves 80. Such a controller E may control the driving unit 40 and the opening and closing of valves including the on-off valves 80, thereby allowing the flow of the fluid in circulation to be controlled.

In this example, the controller E may be an electronic control unit (ECU) that controls the operation of the driving unit 40 and the on-off valves 80. The controller E thus orders the braking to be performed and detects a minute leak situation. The controller E thus controls to secure the braking pressure accordingly.

More specifically, when the signal indicative of the fluid volume in the reservoir 10 is input as low, the controller E controls the first on-off valve 81 and the inlet valves 84 and 85 for the front wheels to be opened and the second on-off valve 82, the third on-off valve 83, and the inlet valves 86 and 87 for the rear wheels to be closed, whereby a first backup mode where the wheel brakes FL and FR of the front wheels are driven may be performed.

In this example, the fluid volume in the reservoir 10 is sensed via the reservoir volume sensor S1. The controller E may warn the driver through the warning light when the signal indicative of the fluid volume is input as low. In particular, when the signal indicative of the fluid volume is input as low, the controller E determines a minute leak and performs the first backup mode for stable braking. In this example, when the first backup mode is performed via the controller E, as illustrated in FIG. 4, the first on-off valve 81 and the inlet valves 84 and 85 for the front wheels are opened, and the second on-off valve 82, the third on-off valve 83, and the inlet valves 86 and 87 for the rear wheels are closed, whereby the wheel brakes FL and FR of the front wheels are supplied with the fluid in the first hydraulic chamber 51 of the hydraulic pressure supply cylinder 50. Accordingly, braking through the wheel brakes FL and FR of the front wheels may be performed.

Particularly, in the present disclosure, the first hydraulic chamber 51 of the hydraulic supply cylinder 50 is connected to the second compartment 12 of the reservoir 10 through the first supply flow path 91. When a minute leak is generated in the flow path connected to the wheel brakes FL and FR of the front wheels, the fluid in the second compartment 12 is lost and the braking through the wheel brakes FL and FR of the front wheels may not be performed.

When a signal indicative of the fluid volume in the second compartment 12 is input as a value belonging to a range where the fluid volume is lost in a state where the first backup mode is performed, the controller E controls the driving unit 40, thereby causing the hydraulic piston 53 to be moved to the maximum value toward the first hydraulic chamber 51. When a pressure value in the first hydraulic chamber 51 is below a limiting value when the hydraulic piston 53 is moved, the controller controls the first on-off valve 81, the second on-off valve 82 and the inlet valves 84 and 85 for the front wheels to be closed and the third on-off valve 83 and the inlet valves 86 and 87 for the rear wheels to be opened, whereby a second backup mode where the wheel brakes RL and RR of the rear wheels are driven may be performed. At this time, the controller E may control a regulating valve 92a to be opened when the secondary backup mode is performed.

In this example, the range of a loss previously stored in the controller E may be set in advance according to the fluid volume and may be determined according to the fluid volume input via the reservoir volume sensor S1. In addition, the fluid volume in the second compartment 12 may be estimated by checking the braking pressure of the wheel brakes FL and FR of the front wheels. Accordingly, a pressure sensor S2 may be provided in each of the first hydraulic circuit 60 and the second hydraulic circuit 70.

Thus, when the fluid volume in the second compartment 12 is estimated to be lost, the controller E controls the driving unit 40 to allow the hydraulic piston 53 to be moved to the maximum value toward the first hydraulic chamber 51, thereby confirming a loss of the fluid in the first hydraulic chamber 51. In other words, as illustrated in FIG. 5, the controller E controls the driving unit 40 to allow the hydraulic piston 53 to be moved to the maximum value toward the first hydraulic chamber 51. When the pressure value measured via the pressure sensor S2 is equal to or less than the limiting value, it is determined that the fluid in the second compartment 12 is lost. Therefore, also lost is the fluid in the first hydraulic chamber 51 of the hydraulic pressure supply cylinder 50. In this example, the limiting value may be 0. When the pressure value corresponding to the amount of displacement of the hydraulic piston 53 is shown as illustrated in FIG. 5, it is determined that the fluid in the first hydraulic chamber 51 is lost.

Through this, the controller E determines that braking by the wheel brakes FL and FR of the front wheels is impossible. Thus, the controller E causes the first on-off valve 81, the second on-off valve 82, and the inlet valves 84 and 85 for the front wheels to be closed, and the third on-off valve 83, the inlet valves 86 and 87 for the rear wheels, and control valve 92a to be opened, whereby the second backup mode where the wheel brakes RL and RR of the rear wheels are driven may be performed. As a result, braking can be performed with the wheel brakes RL and RR of the rear wheels because the fluid is circulated as illustrated in FIG. 6.

As described above, according to the present disclosure, the loss of the fluid after the first backup mode is reconfirmed in response to the occurrence of a minute leak in the hydraulic circuit. The second backup mode is performed accordingly to allow the braking pressure to be secured, thereby improving braking stability and reliability at the time of driving.

While the present disclosure has been particularly illustrated and described with reference to specific embodiments thereof, it will be apparent to those of ordinary skill in the art that various changes in form and details may be made therein without departing from the spirit and scope of the disclosure as disclosed in the accompanying claims.

What is claimed is:
1. An electronic brake system, the system comprising:
a reservoir having a plurality of compartments storing fluids;
a master cylinder connected to a brake pedal and provided with a plurality of master chambers connected to some compartments of the plurality of compartments of the reservoir, respectively;
a hydraulic supply cylinder connected to a driving unit and having a plurality of hydraulic chambers connected to another compartment not connected to the plurality of master chambers and a compartment connected to one of the plurality of master chambers, respectively;
a first hydraulic circuit connecting one of the hydraulic chambers of the hydraulic supply cylinder and wheel brakes of front and rear wheels to each other, and a second hydraulic circuit connecting another one of the hydraulic chambers of the hydraulic supply cylinder and the wheel brakes of the front and rear wheels to each other; and
a plurality of on-off valves each provided in the first hydraulic circuit or the second hydraulic circuit, thereby selectively opening and closing a flow path,
wherein the reservoir is provided with, and the plurality of compartments includes, a first compartment, a second compartment, and a third compartment storing fluids,
wherein the master cylinder is provided with a first master chamber connected to the first compartment and a second master chamber connected to the third compartment, and
wherein the hydraulic supply cylinder is provided with a first hydraulic chamber connected to the second compartment and a second hydraulic chamber connected to the third compartment.
2. The system of claim 1, wherein the second compartment of the reservoir and the first hydraulic chamber of the hydraulic supply cylinder are connected to each other through a first supply flow path and the third compartment of the reservoir and the second hydraulic chamber of the hydraulic supply cylinder are connected to each other through a second supply flow path.
3. The system of claim 2, wherein the second supply flow path is provided with a control valve selectively opening and closing the second supply flow path.
4. The system of claim 1, wherein
the first hydraulic circuit includes a first hydraulic flow path connected to the first hydraulic chamber and the wheel brakes of the front wheels, and a second hydraulic flow path branched off from the first hydraulic flow path and connected to the wheel brakes of the rear wheels; and
the second hydraulic circuit includes a third hydraulic flow path connected to the second hydraulic chamber and the wheel brakes of the rear wheels and a fourth hydraulic flow path branched off from the third hydraulic flow path and connected to the wheel brakes of the front wheels.
5. The system of claim 4, wherein a flow path connecting the first compartment and the first master chamber to each other is connected to the first hydraulic circuit through a first backup flow path, and the second supply flow path is connected to the second hydraulic circuit through a second backup flow path.
6. The system of claim 4, wherein the on-off valves include a first on-off valve provided in the first hydraulic flow path and selectively opening and closing the first hydraulic flow path, a second on-off valve provided in the second hydraulic flow path and selectively opening and closing the second hydraulic flow path, and a third on-off valve provided in the third hydraulic flow path and selectively opening and closing the third hydraulic flow path.
7. The system of claim 6, wherein the on-off valves are configured to further include inlet valves for the front wheels and inlet valves for the rear wheels, each of which is provided correspondingly at the front part of each of the wheel brakes of the front and rear wheels in the first, second, and third hydraulic flow paths connected to the wheel brakes of the front and rear wheels, thereby selectively opening and closing the first, second, and third flow paths.
8. The system of claim 7, further comprising a controller receiving a signal indicative of a fluid volume in the reservoir input via a reservoir volume sensor and controlling operation of the driving unit of the hydraulic supply cylinder and the on-off valves,
wherein, when the signal indicative of the fluid volume in the reservoir is input as low, the controller controls the first on-off valve and the inlet valves for the front wheels to be opened and the second on-off valve, the third on-off valve, and the inlet valves for the rear wheels to be closed, whereby a first backup mode is performed where the wheel brakes of the front wheels are driven.
9. The system of claim 8, wherein the hydraulic supply cylinder is provided with a hydraulic piston dividing the first hydraulic chamber and the second hydraulic chamber and rectilinearly moved by the driving unit,
when a signal indicative of the fluid volume in the second compartment is input as a value belonging to a range where the fluid volume is lost in a state where the first backup mode is performed, the controller controls the driving unit, thereby causing the hydraulic piston to be moved to the maximum value toward the first hydraulic chamber, and, when a pressure value measured via the pressure sensor is below a limiting value, the controller controls the first on-off valve, the second on-off valve, and the inlet valves for the front wheels to be closed and the third on-off valve and the inlet valves for the rear wheels to be opened, whereby a second backup mode is performed where the wheel brakes of the rear wheels are driven.

10. The system of claim 8, wherein, when the secondary backup mode is performed, the controller controls a regulating valve to be opened.

\* \* \* \* \*